(12) United States Patent
Hiscox

(10) Patent No.: US 9,012,557 B1
(45) Date of Patent: Apr. 21, 2015

(54) METHOD OF MAKING AND TREATING SYNTHETIC SPORTING SURFACES

(76) Inventor: William C. Hiscox, Pullman, WA (US)

( * ) Notice: Subject to any disclaimer, the term of this patent is extended or adjusted under 35 U.S.C. 154(b) by 276 days.

(21) Appl. No.: 13/374,789

(22) Filed: Jan. 14, 2012

Related U.S. Application Data

(60) Provisional application No. 61/461,179, filed on Jan. 14, 2011.

(51) Int. Cl.
*C08L 97/02* (2006.01)

(52) U.S. Cl.
CPC ...................... *C08L 97/02* (2013.01)

(58) Field of Classification Search
CPC ....................................................... C08L 97/02
USPC ......................................................... 524/487
See application file for complete search history.

(56) References Cited

U.S. PATENT DOCUMENTS

| | | | |
|---|---|---|---|
| 2002/0086168 A1* | 7/2002 | Sadvary et al. | 428/447 |
| 2003/0215818 A1* | 11/2003 | Lorenz | 435/6 |
| 2006/0084743 A1* | 4/2006 | Chen | 524/445 |
| 2008/0090010 A1* | 4/2008 | Zhang et al. | 427/372.2 |

FOREIGN PATENT DOCUMENTS

GB      2 282 604     * 12/1995

* cited by examiner

*Primary Examiner* — Doris Lee

(57) ABSTRACT

Disclosed is a method of making sporting surfaces, particularly animal racing surfaces such as horse racing tracks, comprising mixing a polysiloxane polymer or polymers with a mixture of solid materials. This invention overcomes many of the problems associated with prior art surfaces, and can be used to modify or repair such prior art surfaces, or can be incorporated into newly manufactured surfaces to greatly enhance their physical properties. The invention imparts highly desirable physical characteristics to manufactured sporting surfaces, extends the temperature range throughout which these surfaces can be used, and provides a more consistent, reliable and long lasting surface.

18 Claims, 2 Drawing Sheets

METHOD OF MAKING AND TREATING SYNTHETIC SPORTING SURFACES

CROSS-REFERENCE TO RELATED APPLICATION

This application claims the benefit of U.S. Provisional Application No. 61/461,179, filed Jan. 14, 2011.

BACKGROUND OF THE INVENTION

1. Field of the Invention

This invention relates to methods of making synthetic racing and sporting surfaces, particularly horse racing tracks, and methods of improving existing sporting surfaces.

2. Background

So-called synthetic surfaces have been used in competitive sport for several decades. In general, these are composite materials with varying amounts of cushion, and are installed as either a "roadbed" (type 1, track and field), as loose fill (type II), or as synthetic turf (type III). As opposed to fixed synthetic track surfaces (type I), such as those used in human racing tracks for track and field events, which are permanently installed and cannot be manipulated once installed, synthetic animal racing tracks (type II) are generally made of a softer and more workable material, which can easily be tilled, mixed and rolled back into place, much like a natural dirt surface. Several attempts have been made at formulating workable synthetic track surfaces of type II, but prior art compositions have had major drawbacks.

Current type II synthetic racing tracks, in general, are made of a combination of an inorganic substrate such as sand, various additive solid materials to impart elasticity, cushion or cohesiveness, and a binder material that promotes adhesion between the solid materials in the mixture. The use of fibers to promote cohesion in a racing surface was first disclosed by Armond (Armond, Victor J., U.S. Pat. No. 4,819,933, 1989), where a surface for equestrian use is formed using a mixture of sand and straight polymeric fibers. The fibers hold the sand together under the weight of travelers. Malmgren et al. (Malmgren, Robert C., Cipra, Jan and Umlauf, Edward L., U.S. Pat. No. 5,020,936, 1991) disclose an animal running surface composition composed of earthen material mixed with rubber particles. Similar compositions using binders were introduced about the same time. Binders, in general, are intended to make the heterogeneous mixtures of solids hold together and form a cohesive and consistent mixture. To date, binder technology for Type II synthetic surfaces has been limited to adding various waxes or rubber/oil mixtures to the inorganic substrates. Prior art binder materials only weakly associate with the inorganic substrates, and binding efficiency is influenced greatly by environmental conditions, such as temperature and moisture content. Several of these prior art surfaces have been referred to as "all-weather surfaces". However, this has been found to be overly optimistic in real world installations.

Examples of polymer in oil types of binders are now well established in the prior art, but a highly representative example is taught by Hawkins, et al. (U.S. Pat. No. 4,792,133, 1988), who introduced a substitute ground surface material consisting of a substrate which was treated with ethylvinylacetate co-polymer dissolved in oil, preferably a soft grease. Alternate polymers disclosed by Hawkins include polystyrene, nylon or PVC. Hawkins and company later disclosed several further innovations, including the use of styrene-co-butadiene rubber in an oil or soft grease (Hawkins et al., U.S. Pat. No. 4,852,870, 1989). Dachtler et al. (Dachtler and Hawkins, Reissue U.S. Pat. No. 34,267, 1993) disclose much the same invention as the Hawkins surfaces previously disclosed.

Macke, on the other hand, has demonstrated a cushioned track surface for sporting events comprised of superposed courses of materials (Macke, Anthony V., U.S. Pat. No. 4,830,532, 1989), including a binding course made of shredded paper. The various materials are layered, one atop the other, each providing a discreet function in the performance of the track.

Bearden and Kottle (Bearden, Charles and Kottle, Sherman, U.S. Pat. No. 5,455,295, 1995) describe a racetrack surface including a synthetic polymer component, a warm hydrocarbon oil fluid, and a particulate material such as sand. The composition additionally incorporates carbon black to improve weatherability and a rakeability promoter to improve rakeability. Bearden continued to teach a substitute ground surface (Bearden, U.S. Pat. No. 5,559,166, 1996) containing sand and a binder comprising amorphous polyolefins or alpha-olefin interpolymers dissolved in a low aromatic oil.

Opfel discloses a soil amendment of a running surface for animal competition where clay granules are used as a binder for sand surfaces (Opfel, U.S. Pat. No. 6,810,831 B1, 2004), but this is no different than traditional sand and clay mixtures often referred to as "American Dirt", used as surfaces for many American horse racing tracks.

Hawkins teaches methods of dust control and soil stabilization employing a binder consisting of polyolefins dissolved in carboxylic acids (Hawkins et al. U.S. Pat. No. 7,081,270 B2, 2006) or polyolefins and cyclic organic compounds dissolved in carboxylic acids (Hawkins et al., U.S. Pat. No. 7,074,266 B2, 2006).

Another polymer in oil binder is disclosed by Pearse (Ian Pearse, U.S. Patent Application US 2008/0017826, 2008), where the polymers ethylene propylene and styrene butadiene dissolved in oil are blended with a particulate containing composition.

Tracks that use wax as a binder are also described in the prior art. The best example is provided by Michael Dickinson (Dickinson, U.S. Pat. No. 5,961,389, 1999), where he describes a sport surface containing a mixture of sand, polyolefin fibers, polyolefin particles, tire fibers and a coating of wax to bind the materials together.

Hubbs has more recently described a surface material particularly suited for non-turf baseball field applications such as the pitcher's mound and base paths comprising clay, wax and sand, with a putty-like consistency.

Prior art binders are known to soften at higher temperatures and lose performance, causing the animals to labor harder to maintain speed. Conversely, at lower temperatures, particularly at freezing temperatures, prior art track surfaces become very firm, and can freeze. Sometimes the frozen surfaces become loose and the various components separate from each other. Surfaces lacking sufficient hydrophobicity or drainage are even more prone to freezing. The prior art binders often fail completely at freezing temperatures, no longer providing an adhesive effect, and allowing the solids to separate catastrophically. The wide variability and unpredictability of performance of prior art surfaces with changing environmental conditions has been a chronic problem. Also, the waxes, oils and polymers used in prior art surfaces tend to be highly susceptible to degradation by several pathways, and are made useless over time, requiring additional binder to be added periodically.

The present invention is a binder for sporting surfaces, which greatly improves their performance and extends their working temperature range, and which solves the aforementioned problems with prior art surfaces. Surfaces made according to the present invention maintain optimum performance over a much wider temperature range, are more water repellent, and are more resistant to environmental, chemical and mechanical degradation than prior art surfaces.

SUMMARY OF THE INVENTION

The invention is a method of making sporting surfaces, particularly animal racing surfaces, comprising mixing a binder, which is a polysiloxane polymer or polymers, with a mixture of solid materials. Furthermore, this invention is a method of improving existing sporting surfaces by mixing a polysiloxane polymer binder with the existing surface. The polysiloxane binder is mixed as a liquid into the solid materials of the sporting surface. Solid materials may include, among other things, sand, fibers, rubber shavings, plastics, or other synthetic or natural materials. The polysiloxane polymer bonds to the surfaces of the solid materials through reactive sites on the polymer, forming covalent bonds between the polysiloxane polymer and the surface. By this invention, the solid materials bond covalently to polysiloxane polymer strands, and are therefore crosslinked to each other by siloxane polymer strands. In contrast, previously known binders have only a weak affinity for sand, and a widely varying affinity for the other materials, do not form covalent bonds with the solid materials, and degrade in adhesive performance at high and low temperatures, which is why these surfaces lose their structural integrity at extremes of temperature experienced at many racing tracks.

This invention comprises the use of polysiloxane polymers, which are compatible with the oil-based waxes, oils and polymers in many of the currently installed synthetic racing tracks around the world, and can also be used with classical dirt surfaces. The polysiloxane polymers can be added to existing track surfaces, or blended as part of the formulation of new surface material. The polysiloxane polymers bond to the surface of the sand, and to the other solid materials through Si—O—Si bonds, and interface with the organic waxes and oils to promote adhesion to the sand. In this way, a more homogeneous and consistent surface is obtained. Track surface material treated with this invention has more consistent performance over a wider temperature range than untreated surfaces, drains water more easily, has less tendency to freeze at very low temperatures, is more consistent in physical form when harrowed and raked, and maintains relatively consistent performance at high temperatures. The invention imparts resistance to environmental degradation of surfaces, due to the very high resistance of the polysiloxane polymers to oxidation, ultraviolet radiation, thermal degradation, corrosion, and chemical and bacterial attack.

Prior art binders currently used in Type II synthetic racing surfaces do not form strong covalent bonds to the materials they are required to bind. The most successful binders to date are generally petroleum waxes, sometimes referred to as "slack waxes", and adhesion is due primarily to weak forces (Van der Waals forces and hydrophobic interactions) between wax molecules, but polar interactions such as hydrogen bonding, etc. may contribute to a minor extent. The mostly petroleum waxes are highly susceptible to environmental damage from ultraviolet radiation and oxidation. Polymers used to date in prior art polymer/oil binders are miscible with oils and waxes, and are dissolved in oil-oftentimes low grade oil or unrefined or semi-refined crude fractions-before application to the solids, and the oils are roughly equally responsible along with the polymers for maintaining adhesion between the solids. However, prior art polymers for polymer in oil systems do not have the ability to bond covalently to the sand and solids, and rely on weak associative forces to form cohesion between the particles. Furthermore, polymers used in prior art polymer in oil binders are highly susceptible to degradation by ultraviolet light and oxidation. Prior art binders have physical properties that vary widely with temperature, making prior art surfaces inconsistent over their working temperature range. It is often noted that prior art synthetic tracks change drastically from morning to afternoon, as they are warmed by the sun, even when cloudy. It is also a very great problem that prior art binders stiffen of freeze completely at colder temperatures, and become too hard to run on. In the worst case, the surface can harden into a block, or conversely, separate catastrophically to dust and loose fibers.

The polysiloxane polymer binders of this invention are capable of strong and extensive covalent bonding with sand, and to varying degrees with the other solids used in sporting surfaces, and form extensive crosslinks between and among polysiloxane polymer molecules and solids. These covalent bonds can break under certain circumstances, but oftentimes will form new bonds with other active sites on polymer strands or substrate surfaces, creating a self-healing or reformable bond. The polysiloxane binders react with active sites on all of the solids, which promotes crosslinking between the materials, and builds those materials into the polymer network that is formed. Crosslinking is controllable and tuneable by adjusting the kind and amount of crosslinkers and/or catalysts that promote crosslinking. The resulting sporting surface material has increased cohesion between the individual particles, and can be compressed into a semisolid mass, yet can easily be turned into a free-flowing particulate suspension, and can be redistributed. This is important in materials used in synthetic animal racing tracks, especially horse racing tracks, which are managed in a similar way to traditional dirt tracks. The surfaces are harrowed, raked and rolled repeatedly, even between races, to distribute the surface evenly for the next use.

In such animal track surfaces, and particularly for horse racing tracks, this invention reduces the amount of labor and machinery needed to maintain a consistent surface, since the polysiloxane binder of this invention assists in the even distribution, binding and mixing of the individual particles, while at the same time decreasing the affinity of the surface materials for animal hooves, tires, shoes and other objects that might travel over the surface. As such, the surface materials do not stick to hooves, shoes or wheels, which has been a chronic and insoluble problem for prior art binders. With prior art binders, sticky surface materials have been known to build up on hooves, creating an extreme hazard to the animals and riders. So called "kickback" is also a nagging problem with both natural dirt and prior art synthetic surfaces, where sticky surface material is thrown backwards from the hooves as the animal traverses the surface. Flying material strikes the following horse and rider, creating a constant hazard during the race. A surface prepared using this invention does not stick to horses' hooves, as do surfaces made of waxes and oils and other polymers, and kickback is reduced.

This invention also provides enhanced and superior cushion, elasticity and energy absorbance with respect to prior art binders, yet remains fluid and well distributed within the solids comprising the bulk of the surface. An unanticipated, but highly desirable feature of the invention is that surfaces made by the invention are dilatant. Although a surface made according to the invention may appear loose and soft in its static state, the action of hooves impacting the surface cause it to firm dramatically under the acceleration, providing enhanced support and return of energy, or bounce from the surface, resulting in more efficient propulsion. The effect is reversible, such that once the compression phase of a hoof-strike is over, the surface returns to its malleable and flowable form.

This invention provides many other benefits never before realized with wax and polymer-bearing surfaces. The invention imparts superior hydrophobicity to the solid materials, improves water drainage, and makes drainage more consistent. Water repellency of the surface is greatly increased by use of this invention. This invention brings many dissimilar materials into compatibility, whereas prior art binders are prone to failure by separation of materials due to incompatibility. Surfaces treated with this invention do not clump or become variable in consistency, as do untreated surfaces.

The polysiloxane polymers of this invention form a binder that has dramatically less variability in performance than standard wax or polymer/oil tracks. A surface made by this invention maintains its performance characteristics over a much wider temperature range than is possible for prior art synthetic surface binders. Track surfaces made by this invention resist freezing and clumping at sub-freezing temperatures, and maintain their strength and cohesiveness, and do not separate, as do prior art binders. At high temperatures (>100 F), prior art wax-bearing synthetic surfaces, as well as polymer in oil binder systems, are known to degrade in performance and fail. This is because the binders used in prior art surfaces soften as the temperature increases until they become liquid, at which time they fail to maintain any cohesion, and the running surface becomes soft and mushy. This invention overcomes that problem, since the polysiloxane polymer of this invention maintains its physical properties of viscosity, cohesion and flow over a very wide temperature range, and because the polysiloxane polymer of this invention forms covalent bonds with substrate surfaces of the solid materials of the composition. Therefore, a surface composition made by this invention maintains cohesion, and does not fail over the entire working temperature range of the synthetic sports surface.

A surface material prepared or treated according to this invention is simple to manufacture, using equipment and techniques very much the same as are used for wax/oil/polymer-bearing surfaces. Simple mixing of the liquid polysiloxane polymer blend of this invention with the solids is all that is required to effect bonding of polymer to solids, and extensive crosslinking occurs between the various components over time in a controlled way. In the case of an existing surface-either dirt or prior art synthetic surface-this invention is applied to the surface using standard spray equipment and pumps. The spray application is performed along with repeated harrowing to mix the polysiloxane polymer of the invention into the surface. This may be repeated several times to gradually "build" the surface content of the polysiloxane polymer. As the polysiloxane polymer of this invention is applied and mixed into the surface components, clumps and irregularities in composition disperse, and the mixture becomes consistent throughout. Therefore, an existing installed synthetic surface can be treated with this invention, such that it can be re-engineered to meet the ideal criteria of strength, cohesiveness, impact absorption, elasticity, consistency and drainage required in a racing surface.

This invention can also be practiced in conjunction with known binder systems for sports surfaces, including widely used waxes, oils and polymers. The polysiloxane polymer of this invention is compatible with most waxes, oils and many polymers, especially those of prior art synthetic surfaces. This invention is best practiced alone, without the inclusion of prior art binders, waxes or other polymers, by adding the polysiloxane polymer of this invention to a mixture of various solids, the solids being selected from a wide list of materials selected for the properties of bulking, cohesion, energy absorption, elasticity, etc. as described in the prior art.

This invention overcomes many of the problems associated with prior art binders and surfaces, and can be used to modify or repair such prior art surfaces, or can be incorporated into newly manufactured surfaces to enhance their physical properties. The invention provides highly desirable physical characteristics to manufactured sporting surfaces, extends the temperature range throughout which these surfaces can be used, and provides a more consistent, reliable and long lasting surface.

DETAILED DESCRIPTION OF THE INVENTION

This invention is a method of making composite sporting surfaces and other surfaces, which are often used for sporting, recreation or other uses, by adding a binder composed of a polysiloxane polymer or polymers to a mixture of solid materials. This invention is also a method of improving composite sporting surfaces, natural dirt surfaces, and the like by mixing a polysiloxane polymer binder into the existing surface. The binder of this invention is a polysiloxane polymer or polymers. The invention functions by bonding to the solid materials comprising the bulk (usually more than 80%) of a so-called synthetic surface, forming polymeric networks throughout the materials, and by modifying the surface properties of the materials, and of other binders, if used.

The polysiloxane polymer of this invention has a very low glass transition temperature, so it remains flowable and flexible at very low temperatures. At the same time, polysiloxane polymers of this invention have a high resistance to heat, and maintain their strength and flexibility at higher temperatures. Furthermore, the polysiloxane polymer binders of this invention form bonds covalently with active sites on the bulk solids, and crosslinking between particles and polymer strands is an important contributor to adhesion. The unique properties of the polysiloxane polymer binders of this invention are imparted to the surface formed according to this invention, such that optimum performance can be maintained throughout a wide temperature range.

In contrast, wax cannot bond covalently to the substrate materials, nor can prior art polymer in oil formulations. The adhesive forces for prior art binders are so-called weak forces, such as Van der Waals forces, hydrophobic interactions, and to a very small extent hydrogen bonding. Prior art binders stiffen at colder temperatures and finally become frozen solid and cease to provide cushion. Prior art surfaces made with prior art binders may also separate catastrophically at freezing temperatures, as the prior art binders cease to provide either cohesion or adhesion. At high temperatures prior art binders soften and fail to provide any adhesion between the particles, causing prior art surfaces to fail at only moderately high temperatures.

Figure 1:
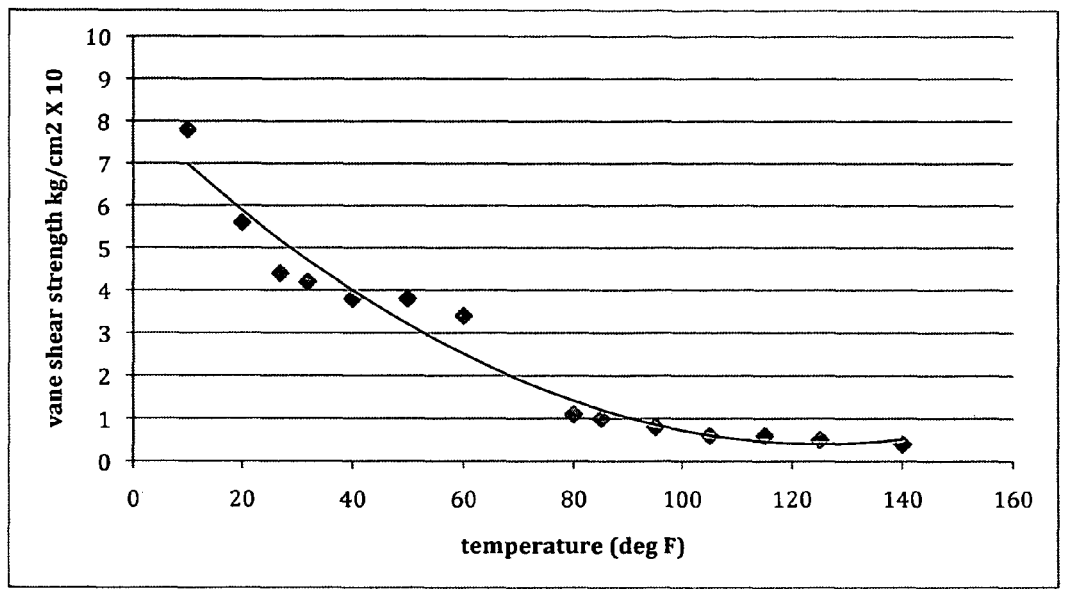
FIG. 1 is a graph of vane shear strength vs. temperature for a representative prior art surface using wax as the binder.

FIG. 1 is a graph of vane shear strength vs. temperature for a representative prior art surface manufactured according to Dickinson (Dickinson, U.S. Pat. No. 5,961,389, 1999). Vane shear strength is a measurement of the cohesive strength between particles of the surface. Optimum performance of a type II surface is indicated by a vane shear score (vane shear strength in kg/cm^2×10) greater than 1 and less than or equal to 3. A vane shear score below 1 indicates failure of the surface. A vane shear score greater than 3 indicates a surface that is becoming too firm. It is clear from the graph that the cohesive strength of the prior art surface varies dramatically with temperature. Below 60 F the cohesive strength increases rapidly and the surface becomes rock hard below 25 F. The surface loosens above 70 F and begins to fail at 80 F. Above 100 F there is very little change in the surface cohesion, as it has already failed. This can be subjectively correlated with race track performance in an installed prior art surface. It is known that this prior art surface generally performs best between 60-70 degrees Fahrenheit, softens quickly above this range, and conversely begins to harden below 60 F.

Figure 2:
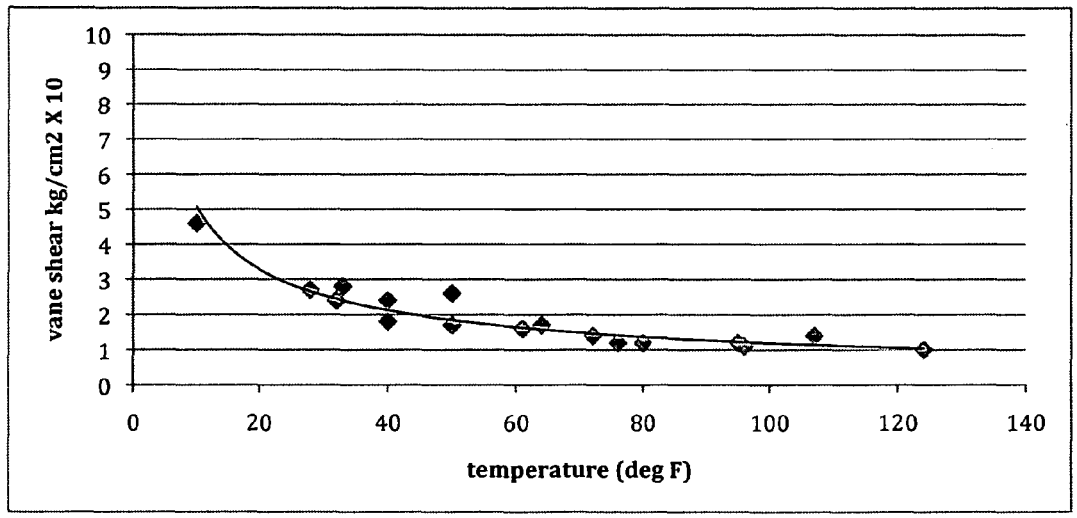
FIG. 2 is a graph of vane shear strength vs. temperature for the prior art surface treated with the polysiloxane binder of this invention.

FIG. 2 is a graph of vane shear strength vs. temperature for the same prior art surface treated with the polysiloxane polymer binder of this invention. The graph clearly shows that treatment of the prior art surface with this invention dramatically extends the temperature range in which the surface remains optimal. Failure of the surface does not occur below 120 F in the prior art surface treated with this invention. Furthermore, the prior art surface treated with this invention maintains its optimal vane shear strength and optimal cohesion down to about 20 F, and remains relatively soft and workable even below 15 F, when compared to the untreated prior art surface, and does not separate or fail, as does the prior art surface, at very cold temperatures. In this case, the binder of this invention was added at less than 20% by weight of the prior art wax binder.

Figure 3:
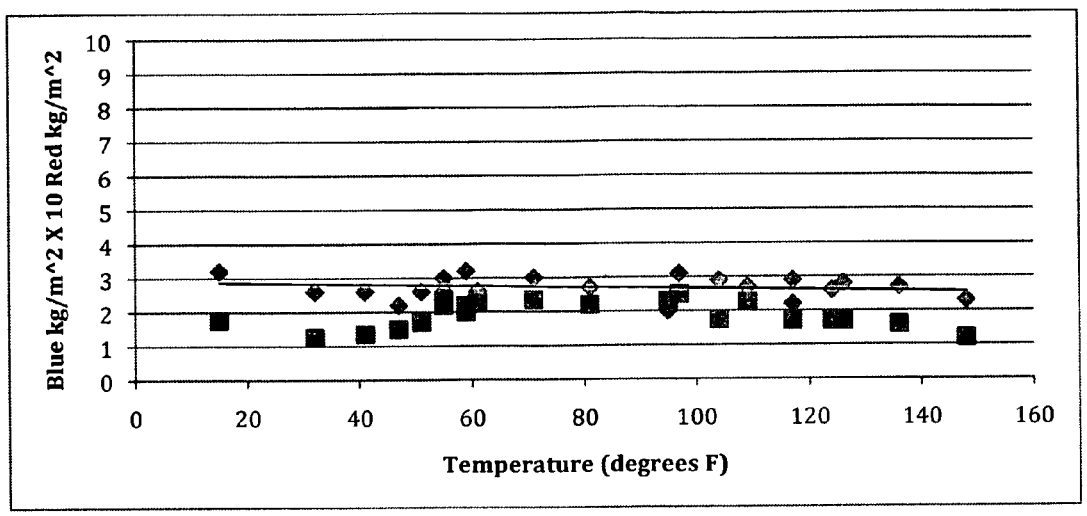
FIG. 3 is a graph of vane shear strength vs. temperature for a wholly new surface formula of this invention using two distinct polysiloxane binders and a third binder consisting of mineral oil, in which the proportions of the three binders were adjusted for optimum performance.

FIG. 3 shows graphs for a wholly new surface formula made by this invention using two distinct polysiloxane binders and a third binder consisting of mineral oil, in which the proportions of the three binders were adjusted for optimum performance. The diamond shaped data points are the vane shear score for the new surface formula of this invention, while the square data points are a static penetration strength measurement (penetrometer reading). The new surface of this invention has excellent high temperature performance, and maintains its integrity up to at least 150 F. The invention also prevents freezing of the surface, and maintains cushion to a very low temperature, and does not harden, freeze or separate at very low temperatures. The wholly new surface formula of this invention slowly improves in performance after installation, as the binders of this invention bond more completely with the solid materials, and as crosslinkers used in this invention form new bonds with the polysiloxane polymer of this invention.

Solid materials used in prior art Type II sporting surfaces having a flowable and malleable structure, and capable of being mixed and reshaped, include primarily sand (or other aggregate soil) and a combination of various additive solids. The additive solids may include rubber shavings, plastic bits, felt and/or fibers, among other materials. Typically, the additive solids are variously used to provide elasticity, softness, energy absorption and return, cohesion, and other desirable physical properties of a competitive surface. The invention is compatible with most of these materials.

In manufacturing a sporting surface, this invention is practiced by mixing the polysiloxane binder with the solid materials to provide intimate contact between the polysiloxane binder and the surfaces of the solid materials. The polysiloxane polymer binder then reacts with reactive surface groups on the solids, either directly or through crosslinkers, forming covalent bonds with the materials. A polymer network is formed throughout the mass, of which the solids become an integral part. The polymer network is formed and crosslinked in a controllable way, such that the polysiloxane polymer remains well distributed throughout the bulk mixture without forming differing zones, thus maintaining homogeneity throughout the bulk.

The polysiloxane polymer binder is comprised of a polysiloxane polymer optionally having reactive end groups, branching groups, or reactive moieties along the polymer chain, and optionally a crosslinking agent or agents, preferably a monomeric or polymeric alkylsilane or dialkylsilane, an alkoxysilane or a chlorosilane, and more preferably a trivalent boron compound, and most preferably a combination of crosslinkers, and optionally a catalyst capable of accelerating bonding and crosslinking reactions between polysiloxane polymers, crosslinkers and solids.

In a first embodiment of the invention the polysiloxane polymer binder is polydimethylsiloxane (PDMS). PDMS is readily available from numerous sources, is widely recognized as safe, and is ubiquitous in cosmetic formulations, lotions, shampoos and conditioners, fabric softeners, construction materials, and many other consumer products, including drugs and medical implants. This invention may be practiced by applying PDMS alone, or with crosslinkers, catalysts and other additives to the bulk solids to be treated.

In a preferred embodiment of this invention, the polysiloxane polymer has reactive groups either on the ends of the polymer chain, along the backbone of the polymer chain, or both, and is a liquid. The viscosity of the polysiloxane polymer may be varied to tailor the properties of the invention as needed. The polysiloxane polymer most preferably has hydroxy end groups. In a most preferred embodiment, the polysiloxane polymer is hydroxy-terminated polydimethylsiloxane.

In another preferred embodiment, the polysiloxane polymer is substituted along the polysiloxane polymer backbone with methyl, ethyl or higher alkyl chain hydrocarbons, substituted alkyl hydrocarbons or aromatic hydrocarbons and substituted aromatic hydrocarbons, said hydrocarbons being bonded to silicon atoms in the polysiloxane polymer backbone, and said hydrocarbon substituents having carbon number between 1-36 (methyl, ethyl, propyl, etc.). The pendant alkyl or aryl groups may be distributed evenly along the polymer backbone, or randomly thereof, and there may be discontinuities in the polymer structure where a particular silicon center is without a hydrocarbon substituent. However, the generalized structures of the polysiloxanes of this invention are as follows:

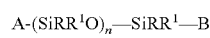

where R and $R^1$ represent any of hydrogen, methyl, alkyl, aryl, substituted alkyl or aryl, alkoxide, or other hydrocarbon substituents, and R may or may not be the same as $R^1$, A and B are terminal groups capable of bonding to silicon, and A and B may or may not be the same group. In preferred embodiments, A and B are hydroxide, hydrogen or other reactive end groups, but there is no restriction as to the nature of A and B with respect to the function of the invention, and no requirement for A or B to be a reactive group for the invention to function in the described way.

Examples of individual polymeric units that may comprise the polysiloxane polymer of this invention have formula unit structures as follows (and many more are possible):

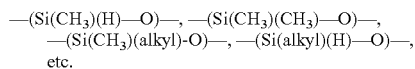
—(Si(CH$_3$)(alkyl)-O)—, —(Si(alkyl)(H)—O)—,
etc.

Suitable polysiloxane polymers of this invention may be liquids, gels or gums. In the preferred embodiments of this invention, the polysiloxane polymers are liquids with viscosities ranging from 10 to 50,000 centistokes (cSt) at room temperature, and molecular weights between 400 and 150,000, and may be liquids, waxes, gels or gums at room temperature. However, in a most preferred embodiment of the invention, the polysiloxane polymer binder is a liquid with a viscosity of between 5 and 5000 cSt (centistokes).

This invention may also be practiced by mixing precursors to polysiloxane polymers with the solids making up the bulk of the surface composition to be formed, such that said precursors then react in the presence of the solids to form the polysiloxane polymers of this invention. Such precursors may be the appropriate monomeric substituted silanes, or linear or cyclic dimers, trimers, tetramers, pentamers, or other -mers substituted appropriately to result in the polysiloxane polymers of the invention.

In a preferred embodiment of the invention a crosslinker is used. The crosslinker may be any crosslinker capable of reacting with reactive sites on the siloxane polymer. The crosslinker is preferably a monomeric or polymeric silane, alkylsilane, dialkylsilane, alkoxysilane, dialkoxysilane, alkylalkoxysilane, alkylsilanol or dialkylsilanol, an acetoxyalkylsilane, or alkylchlorosilane, or a trivalent boron compound. The crosslinker may also be any reactive silane not containing alkyl groups, as long as it is capable of forming bonds to the reactive polysiloxane. Numerous examples exist, but preferred crosslinkers include trialkoxyalkylsilanes such as triethoxyoctylsilane, triacetoxyalkylsilanes, polydiethoxysilanes, poly(methyl-hydrogen)siloxane polymers, cyclic methyl-hydrogensiloxanes, tetraalkoxysilanes, and the like, which form virtually permanent covalent bonds between polymer strands, and to substrate surfaces.

Crosslinkers may also include inorganic agents or minerals, such as inorganic metal carbonates, and trivalent boron compounds, borates, boric acid, boric acid esters, boronic esters and other organoboron compounds. Trivalent boron compounds are particularly useful as crosslinkers in several preferred embodiments of this invention, due to their ability to selectively crosslink polysiloxane polymers under certain conditions. In particular, a surface made by this invention can be enhanced by using a trivalent boron compound, such that at high temperatures and high loading conditions, and under mechanical stress, the trivalent boron compound will crosslink the polysiloxane polymers to a greater extent than at lower temperatures or zero loading. The effect is transient and reversible, so that crosslinks formed under mechanical stress and/or heat loading are not permanent, and can again be broken. The overall effect is to maintain the optimum cohesive strength of the surface at high temperatures and high loading conditions, while on the other hand not compromising low and moderate temperature performance of the surface.

In another preferred embodiment of the invention a catalyst is used to accelerate the crosslinking reactions. Any catalyst capable of accelerating condensation or addition reactions with polysiloxanes may be used. The list of possible catalysts is very long, but in a preferred embodiment of the invention the catalyst is dibutyltin dilaurate, and in another preferred embodiment the catalyst is Pt(0) or an organoplatinum(0) complex. Choice of catalyst and catalyst loading level is used to control the rate and extent of crosslinking reactions, depending on the desired properties of the polysiloxane polymer binder.

The invention can be practiced by adding the polysiloxane polymer to an existing installed synthetic surface. The invention may also be practiced by adding the polysiloxane binder to freshly made synthetic surface material, or by adding the polysiloxane binder along with other binders to solid materials commonly used in the manufacture of synthetic surfaces. A preferred way to practice the invention is to use the polysiloxane binder or binders of this invention as the sole binder, further tailoring the properties of the resulting surface composition by using selected crosslinker(s) and catalyst(s).

Example 1

Treatment of an Existing Surface

An existing synthetic track in Fair Hill, Md., originally manufactured and installed by Tapeta Footings (as described in Dickinson, U.S. Pat. No. 5,961,389, 1999), and having been in place for about three years, was experiencing numerous problems due to both inclement weather in the winter months and because of breakdown of the rubber shavings used in the surface. During colder months the surface would freeze, and the fibers in the frozen surface separated from the sand and other components. This was due to the wax freezing, hardening, becoming brittle, and losing adhesion at freezing temperatures, ceasing to act as a binder. During the warmer months of the year, the surface became very warm from infrared absorption, which melted the wax, making the surface too soft and mushy. Furthermore, the warm, softened wax was found to have degraded the rubber shavings, which were softening and falling apart, making the surface very sticky, and releasing carbon black filler into the surface, which darkened the surface, and made infrared heating worse, causing the rubber breakdown to accelerate. The resulting surface became very sticky at all temperatures, and the surface material stuck to the horses' hooves. The material would then build up on the hoof until there were dangerous amounts of it attached to the hooves, making running difficult and dangerous. The present invention solved all of these problems. The invention was applied to the track in the following way. To hydroxy-terminated polydimethylsiloxane was added a triethoxyalkylsilane crosslinker in an amount approximately 2 percent by weight of the hydroxy-terminated polydimethylsiloxane and mixed well into the polysiloxane polymer. A catalyst consisting of dibutyltin dilaurate in an amount between 0.25% and 1% by weight of the hydroxy-terminated polydimethylsiloxane was added to the mixture, which was then mixed thoroughly for 5-10 minutes. The polysiloxane polymer binder of this invention, thus formulated, was added to the track surface at the application rate of approximately 0.065 kg per square foot of surface using a pump and spray bar to dispense the polysiloxane polymer, and the surface was immediately thereafter harrowed repeatedly to mix the polysiloxane polymer of this invention into the uppermost 4 inch layer of the track surface material. As a result of the treatment of the Fair Hill surface with this invention, the surface became much more uniform, and ceased to stick to horses hooves or farm equipment used in the maintenance of the track. The surface became more consistent and homogeneous, and remained so at freezing temperatures, allowing training to be performed throughout the winter. The polysiloxane polymer treated surface did not freeze or separate as it had prior to treatment. Drainage of water was greatly improved. Kickback was reduced, and the treated surface provided a very stable and firm footing, even though it was at the same time loose in appearance and very easy to harrow and redistribute. Thus, this invention imparted many desirable properties to the existing surface, and solved the most urgent problems with the integrity and safety of the surface.

Example 2

Manufacture of a New Surface Using a Combination of Polysiloxane Polymer Binder with Prior Art Binders A new, unused sample (1 kg) of a conventional prior art synthetic sporting surface manufactured by Tapeta Footings, Inc. according to Dickinson (Dickinson, U.S. Pat. No. 5,961, 389, 1999) was treated with the present invention in essentially the same proportion as for example 1. After mixing well, the sample was tested for its ability to withstand freezing temperatures, and to maintain cushion and integrity throughout its working temperature range. The resulting surface by this invention was found to have dramatically improved properties over the untreated prior art surface. FIG. 2 shows a graph of vane shear strength vs. temperature for the treated sample. Compared to an untreated sample of the same material (FIG. 1), the shear strength of the treated material maintained optimum performance over a much wider range of temperatures, and did not fail at higher temperatures (at least up to 120 F). Furthermore, the treated prior art surface material did not freeze, did not separate at freezing temperatures, and maintained its workability and cushion.

Example 3

Manufacture of a Wholly New Synthetic Sporting Surface Formula Comprising Various Solid Materials and a Mixture of Polysiloxane Polymer Binders and Crosslinkers A 2.5 kg sample of a wholly new synthetic surface composition was prepared as follows. Two polysiloxane binders were used. The first polysiloxane binder (Binder 1) consisted of a polyalkylmethylsiloxane polymer having the general formula —(RR'SiO)n—, where R=CH3, and R' is a mixture of monovalent hydrocarbon substituents having between 1-36 carbons. The second polysiloxane binder (Binder 2) was hydroxy-terminated polydimethylsiloxane having a viscosity of approximately 5,000 cSt. The third binder (Binder 3) was mineral oil having a viscosity of approximately 200 cSt. The crosslinker used was boric acid. According to this invention, the three binders were mixed with the dry, solid ingredients in the following proportions, first adding Binder 3, then Binder 1 and Binder 2 in that order, with mixing in-between binder additions.
Sand 84%
Waste new carpet fibers 2.0%
Cut Polyester fibers 0.2%
Cut Spandex fibers 1.4%
Mixed, chopped plastics 5.1%
Mica 3.0%
Binder 1 1.5%
Binder 2 1.5%
Binder 3 0.5%
Crosslinker 1.0%

After dispersing all three binders into the solids, the resulting mixture was mixed continuously to fully coat all of the solids, and the fully blended new surface material was set aside to cure at room temperature. Over several days with occasional mixing, the binders fully invaded the fiber and solids, and crosslinked to make a cohesive mass. As time went on, the mass became more cohesive, and had a smoother, more consistent feel. It was tested repeatedly during this time to examine its properties. In general, the wholly new synthetic sporting surface of the present invention was found to be consistently strong and supportive over a very wide temperature range. Vane shear strength was very consistent from 15 deg F. to 150 deg F., and penetration strength varied only moderately at high and low temperatures, and was optimal between 50 F and 120 F (see FIG. 3).

What is claimed is:

1. A method of making synthetic sporting surfaces comprising mixing a polysiloxane polymer or polymers with a mixture of solid materials comprised of sand, waste new carpet fibers, cut polyester fibers, cut spandex fibers, mixed chopped plastics, rubber pieces and mica, the solids being present in any proportion.

2. The method of claim 1 where the polysiloxane polymer is polydimethylsiloxane.

3. The method of claim 1 where the polysiloxane polymer is hydroxy-terminated polydimethylsiloxane.

4. The method of claim 1 where the polysiloxane polymer is either polymethylhydrogensiloxane or polyethylhydrogensiloxane.

5. The method of claim 1 where the polysiloxane polymer is a polydialkylsiloxane with the general unit formula —($RR^1Si$—O)—, where R is a methyl (—$CH_3$) or ethyl (—$C_2H_5$) fragment and $R^1$ is one or more of the group of monovalent hydrocarbon or substituted hydrocarbon fragments having from 1 to 36 carbons.

6. The method of claim 1 where a catalyst or catalysts is incorporated with the polysiloxane polymer.

7. The method of claim 1 where both a crosslinker and a catalyst are incorporated with the polysiloxane polymer.

8. The method of claim 1 in which oil, wax or a polymer other than a polysiloxane polymer is used as an additive.

9. The method of claim 1 in which a polymer in oil mixture is used as an additive.

10. The method of claim 1, wherein the polysiloxane polymer or polymers is formed in-situ from corresponding silane or siloxane monomers, linear or cyclic siloxane dimers, trimers, tetramers, or pentamers, or higher order precursors having the appropriate substituents on silicon that will naturally lead to the formation of polysiloxane polymers, comprising mixing of said precursors with the mixture of solid materials.

11. The method of claim 1 where the mixture of solid materials is comprised of an existing sporting surface.

12. The method of claim 1 where the mixture of solid materials is comprised of about 70-90% sand, 1-5% waste new carpet fibers, 0.1-5% cut polyester fibers, 1-5% cut spandex fibers, 3-7% mixed chopped plastics, 0-5% rubber pieces, and 0.5-20% mica.

13. The method of claim 1, where one of the polysiloxane polymers is a polyalkylmethylsiloxane polymer having the general monomer unit formula —($RR^1SiO$)—, where R=$CH_3$ or $C_2H_5$, and $R^1$ is a monovalent hydrocarbon substituent having between 1-36 carbons or a mixture of monovalent hydrocarbon substituents having between 1-36 carbons, and another of the polysiloxane polymers is hydroxy-terminated polydimethylsiloxane.

14. The method of claim 1 where a crosslinker or crosslinkers is incorporated with the polysiloxane polymer.

15. The method of claim 14 where at least one crosslinker is a trialkoxyalkylsilane or a triacetoxyalkylsilane.

16. The method of claim 14 where at least one crosslinker is triethoxyoctylsilane.

17. The method of claim 14 where at least one crosslinker is a trivalent boron compound.

18. The method of claim 14 where at least one crosslinker is boric acid.

\* \* \* \* \*